(12) United States Patent
Mohammed et al.

(10) Patent No.: US 10,735,962 B2
(45) Date of Patent: *Aug. 4, 2020

(54) METHOD AND SYSTEM FOR IMPLEMENTING AD HOC WIRELESS CAPACITY MODIFICATION

(71) Applicant: CenturyLink Intellectual Property LLC, Broomfield, CO (US)

(72) Inventors: Pasha G. Mohammed, Monroe, LA (US); Gnanasekaran Swaminathan, Monroe, LA (US); Robert J. Morrill, Overland Park, KS (US)

(73) Assignee: CenturyLink Intellectual Property LLC, Broomfield, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/289,358

(22) Filed: Feb. 28, 2019

(65) Prior Publication Data

US 2019/0200241 A1 Jun. 27, 2019

Related U.S. Application Data

(63) Continuation of application No. 15/810,523, filed on Nov. 13, 2017, now Pat. No. 10,225,746.

(60) Provisional application No. 62/452,727, filed on Jan. 31, 2017.

(51) Int. Cl.
*H04W 12/06* (2009.01)
*H04W 16/24* (2009.01)
*H04W 16/26* (2009.01)
*H04W 88/08* (2009.01)
*H04W 84/18* (2009.01)

(52) U.S. Cl.
CPC .......... *H04W 12/06* (2013.01); *H04W 16/24* (2013.01); *H04W 16/26* (2013.01); *H04W 84/18* (2013.01); *H04W 88/08* (2013.01)

(58) Field of Classification Search
CPC ..... H04W 16/24; H04W 16/26; H04W 12/06; H04W 84/18; H04W 88/08
See application file for complete search history.

(56) References Cited

U.S. PATENT DOCUMENTS

| | | | | |
|---|---|---|---|---|
| 9,913,102 | B2* | 3/2018 | Singh | H04W 24/02 |
| 9,961,663 | B2* | 5/2018 | Ofir | H04W 64/003 |
| 10,225,746 | B2* | 3/2019 | Mohammed | H04W 16/26 |
| 10,274,632 | B1* | 4/2019 | Olsson | G01S 19/00 |

(Continued)

*Primary Examiner* — Brandon J Miller

(57) ABSTRACT

Novel tools and techniques are provided for implementing wireless communications, and, more particularly, to methods, systems, and apparatuses for implementing ad hoc wireless capacity modification. In various embodiments, a computing system might identify at least one geographic area having at least one of weak wireless communications coverage or non-existent wireless communications coverage, might deploy one or more vehicles to the identified at least one geographic area, each of the one or more vehicles comprising a mobile wireless base station, and might establish wireless network communications between the mobile wireless base station of at least one vehicle of the one or more vehicles and at least one wireless network node of a telecommunications network that is one of proximate to or within the at least one geographic area. The one or more vehicles might comprise manned and/or unmanned vehicles, including drones.

20 Claims, 7 Drawing Sheets

(56) References Cited

U.S. PATENT DOCUMENTS

| | | | |
|---|---|---|---|
| 2014/0253021 A1* | 9/2014 | Luke | H02J 7/0013 |
| | | | 320/107 |
| 2016/0028471 A1* | 1/2016 | Boss | H04W 84/06 |
| | | | 455/406 |
| 2017/0310550 A1* | 10/2017 | Mandle | H04L 41/12 |
| 2017/0311351 A1* | 10/2017 | Gupta | H04W 4/70 |
| 2018/0007518 A1* | 1/2018 | O'Berry | H04B 7/15507 |
| 2018/0009526 A1* | 1/2018 | Spengler | B64C 39/024 |
| 2018/0019802 A1* | 1/2018 | Teague | H04B 7/18506 |
| 2018/0035448 A1* | 2/2018 | Gupta | H04W 4/70 |
| 2018/0144302 A1* | 5/2018 | Murray | G06Q 10/08355 |

* cited by examiner

METHOD AND SYSTEM FOR IMPLEMENTING AD HOC WIRELESS CAPACITY MODIFICATION

CROSS-REFERENCES TO RELATED APPLICATIONS

This application is a continuation application of U.S. patent application Ser. No. 15/810,523 (the "'523 application"), filed on Nov. 13, 2017 by Pasha G. Mohammed et al., entitled, "Adhoc Wireless Capacity Addition System," which claims priority to U.S. Patent Application Ser. No. 62/452,727 (the "'727 application"), filed on Jan. 31, 2017 by Pasha G. Mohammed et al., entitled, "Adhoc Wireless Capacity Addition System," the disclosure of which is incorporated herein by reference in its entirety for all purposes.

This application may be related to U.S. patent application Ser. No. 15/840,165 (the "'165 application"), filed on Dec. 13, 2017 by Phil Carpenter et al., entitled, "Method and System for Implementing Self-Organizing Mobile Network (SOMNET) of Drones and Platforms," which claims priority to U.S. Patent Application Ser. No. 62/533,853 (the "'853 application"), filed Jul. 18, 2017 by Phil Carpenter, entitled, "Drone Charging Station on Poles," the disclosure of each of which is incorporated herein by reference in its entirety for all purposes. This application may also be related to U.S. patent application Ser. No. 15/840,265 (the "'265 application"), filed on Dec. 13, 2017 by Phil Carpenter et al., entitled, "Method and System for Implementing Self-Organizing Mobile Network (SOMNET) of Drones and Platforms," which claims priority to the '853 application, the disclosure of each of which is incorporated herein by reference in their entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing wireless communications, and, more particularly, to methods, systems, and apparatuses for implementing ad hoc wireless capacity modification.

BACKGROUND

In conventional telecommunications systems, augmenting wireless capacity where coverage is weak or providing wireless capacity where no wireless coverage is available requires surveying an appropriate portion of a geographic area having such weak or non-existent wireless coverage, building tower-based wireless base stations, and physically connecting such base stations to an existing network. Such implementations are time consuming and require cost and resources. Although cell-on-wheels ("COW") solutions currently exist and provide some mobile solutions to weak or non-existent wireless coverage, such conventional solutions are cumbersome and do not provide for response, flexibility, and autonomy required to maintain good or excellent wireless capacity in a given set of geographic areas.

Hence, there is a need for more robust and scalable solutions for implementing wireless communications, and, more particularly, to methods, systems, and apparatuses for implementing ad hoc wireless capacity modification.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
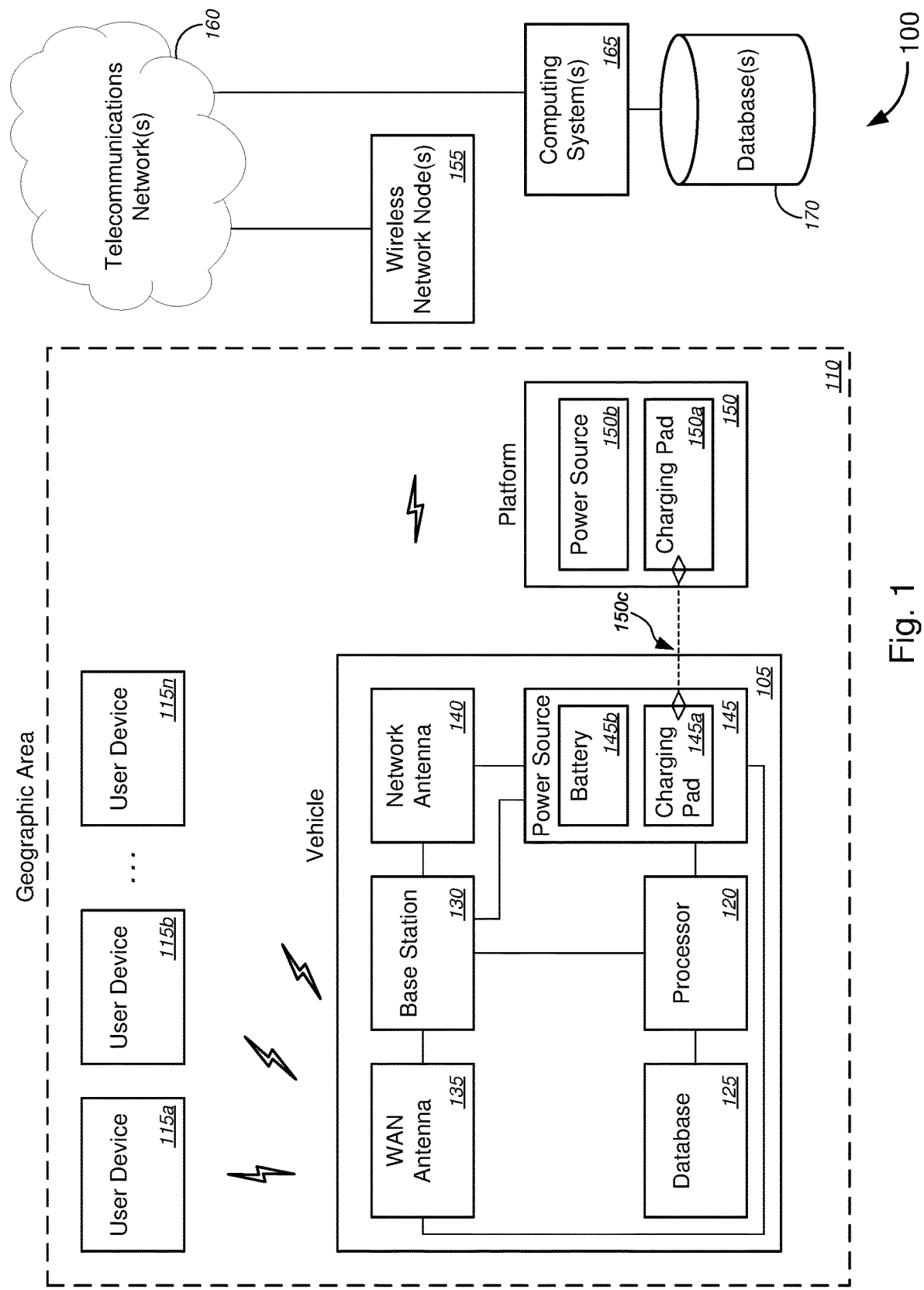
FIG. 1 is a schematic diagram illustrating a system for implementing ad hoc wireless capacity modification, in accordance with various embodiments.

Various embodiments provide tools and techniques for implementing wireless communications, and, more particularly, to methods, systems, and apparatuses for implementing ad hoc wireless capacity modification.

In various embodiments, a computing system might identify at least one geographic area having at least one of weak wireless communications coverage or non-existent wireless communications coverage, might deploy one or more vehicles to the identified at least one geographic area, each of the one or more vehicles comprising a mobile wireless base station, and might establish wireless network communications between the mobile wireless base station of at least one vehicle of the one or more vehicles and at least one wireless network node of a telecommunications network that is one of proximate to or within the at least one geographic area. The one or more vehicles might comprise manned and/or unmanned vehicles, including drones.

According to some embodiments, a land vehicle or an airborne drone might be equipped with a wireless base station, which would establish a mobile wireless network. The base station might be connected to a remote network (e.g., service provider network, telecommunications network, Internet, etc.) through a wireless connection, which could utilize at least one of wireless mesh, point-to-point wireless, point-to-multi-point wireless, microwave, optical link technology (e.g., Li-Fi, or other optical link technology or the like), or other wireless technology, or the like. In a non-omnidirectional wireless solution, given the mobility of the solution, a self-adjusting antenna that maintains optimum signal connectivity to the remote network may be employed. This solution could be implemented using logic in the vehicle or drone such that optimal signal connectivity is maintained (i.e., the antenna is fixed, but the body of the vehicle or drone may be positioned/repositioned to point to a wireless access point or wireless network node of the remote network, or the like). The wireless technology may be variable and could be 2G/3G/4G/5G, Wi-Fi, Z-wave, ZigBee, LoRa, RPMA, or other wireless technology, a drone-enable solution may contain an inductive wireless charging solution, where one or more charging pads in a charging platform and also one or more charging pads on the drone might be used to charge the drone via inductive power transfer. Inductive charging allows for remote charging without human intervention, thus allowing for autonomous or remote-controlled operations of the drones or the like.

The various embodiments as mentioned above and as described below with respect to the figures provide the following benefits or advantages: the various embodiments augment wireless capacity where coverage is weak; and the various embodiments provide wireless capacity where no wireless coverage is currently available. The various embodiments also provide relatively quick response (e.g., to compromised, weakened, or downed wireless capacity in a given geographic area, or the like), flexibility in network coverage and base station deployment (particularly where no roads or no traversable roads (e.g., where snow covered, rock-slide covered, mud-slide covered, washed away, flooded, or other roadway conditions exist)), and autonomy (in the case of autonomous vehicles or drones sent via computer system control that identifies such areas and deploys the autonomous vehicles or drones to augment or provide wireless capacity to the identified geographic areas), and/or the like.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, wireless communications technology and/or the like. In other aspects, certain embodiments, can improve the functioning of user equipment or systems themselves (e.g., wireless user devices, wireless network systems, wireless communications networks, etc.), for example, by identifying, with a first computing system, at least one geographic area having at least one of weak wireless communications coverage or non-existent wireless communications coverage; deploying one or more vehicles to the identified at least one geographic area, each of the one or more vehicles comprising a mobile wireless base station; establishing, with a second computing system, wireless network communications between the mobile wireless base station of at least one vehicle of the one or more vehicles and at least one wireless network node of a telecommunications network that is one of proximate to or within the at least one geographic area; and in some cases also, establishing, via one or more WAN antennas, wireless communications with one or more user devices associated with one or more customers in the identified at least one geographic area, and providing the one or more user devices with network access to the telecommunications network via the one or more WAN antennas, the mobile wireless base station, at least one service provider network antenna, and the at least one wireless network node; and/or the like. In particular, to the extent any abstract concepts are present in the various embodiments, those concepts can be implemented as described herein by devices, software, systems, and methods that involve specific novel functionality (e.g., steps or operations), such as, deploying or sending drones or other vehicles (each comprising a wireless base station) to augment wireless capacity in a geographic area having weak wireless coverage or to provide wireless capacity in a geographic area where no wireless coverage is currently available, based on an identification of one or more such geographic areas, and/or the like, to name a few examples, that extend beyond mere conventional computer processing operations. These functionalities can produce tangible results outside of the implementing computer system, including, merely by way of example, augmenting wireless capacity in a geographic area having weak wireless coverage and/or providing wireless capacity in a geographic area where no wireless coverage is currently available, and/or the like, at least some of which may be observed or measured by customers and/or service providers.

In an aspect, a method might comprise identifying, with a first computing system, at least one geographic area having at least one of weak wireless communications coverage or non-existent wireless communications coverage; deploying one or more vehicles to the identified at least one geographic area, each of the one or more vehicles comprising a mobile wireless base station; and establishing, with a second computing system, wireless network communications between the mobile wireless base station of at least one vehicle of the one or more vehicles and at least one wireless network node of a telecommunications network that is one of proximate to or within the at least one geographic area.

In some embodiments, each of the first computing system and the second computing system might comprise at least one of one or more vehicle processors disposed in each of the one or more vehicles, one or more processors disposed in a user device associated with an operator of a service provider, a server computer, a distributed computing system, or a cloud computing system, and/or the like. In some cases, the first computing system and the second computing system might be the same computing system.

According to some embodiments, each of the one or more vehicles might comprise one of a manned vehicle or an unmanned vehicle, and/or the like. In some instances, each manned vehicle might comprise one of a car, a motorcycle, an all-terrain vehicle, a truck, a van, a semi-trailer truck, an aircraft, or a water craft, and/or the like. In some cases, each unmanned vehicle might comprise one of an aerial drone, a land-based drone, a water-based drone, or an autonomous vehicle, and/or the like. Merely by way of example, in some instances, at least one vehicle of the one or more vehicles might comprise an inductive charging system that charges via inductive power transfer from one or more charging pads in a corresponding charging platform. In some cases, the inductive charging system might comprise an authentication system. The method might further comprise authenticating, with the inductive charging system, the at least one vehicle to determine whether the at least one vehicle is authorized to be charged; based on a determination that the at least one vehicle is authorized to be charged, activating, with the inductive charging system, the one or more charging pads to cause the one or more charging pads to charge one or more batteries of the at least one vehicle; and based on a determination that the at least one vehicle is unauthorized to be charged, preventing, with the inductive charging system, the one or more charging pads from charging the at least one vehicle.

In some embodiments, the wireless network communications might be based on wireless communications protocols or standards comprising at least one of 2G standard, 3G standard, 4G standard, 5G standard, Wi-Fi standard, Z-wave standard, ZigBee standard, LoRa standard, or random phase multiple access ("RPMA") standard, and/or the like. In some cases, the wireless network communications might comprise at least one of a wireless mesh, a point-to-point wireless communications link, a point-to-multi-point wireless communications link, optical link technology, or a microwave link, and/or the like. In some instances, the at least one wireless network node comprises a wireless access point ("WAP"), or the like.

According to some embodiments, the at least one vehicle might further comprise an omnidirectional antenna, where establishing the wireless network communications between the mobile wireless base station of the at least one vehicle of the one or more vehicles and the at least one wireless network node of the telecommunications network might comprise establishing, with the second computing system and via the omnidirectional antenna, an omnidirectional wireless communications link between the mobile wireless base station of the at least one vehicle and the at least one wireless network node of the telecommunications network.

Alternatively, or additionally, the at least one vehicle might further comprise a non-omnidirectional antenna, where establishing the wireless network communications between the mobile wireless base station of the at least one vehicle of the one or more vehicles and the at least one wireless network node of the telecommunications network might comprise establishing, with the second computing system and via the non-omnidirectional antenna, a directional wireless communications link between the mobile wireless base station of the at least one vehicle and the at least one wireless network node of the telecommunications network. In some instances, the non-omnidirectional antenna comprises a self-adjusting antenna that maintains optimum signal connectivity with the at least one wireless network node.

In some embodiments, the at least one vehicle might further comprise one or more wide area network ("WAN") antennas and at least one service provider network antenna, where establishing the wireless network communications between the mobile wireless base station of the at least one vehicle and the at least one wireless network node of the telecommunications network might comprise establishing, with the second computing system and via the at least one service provider network antenna, the wireless network communications between the mobile wireless base station of the at least one vehicle and the at least one wireless network node of the telecommunications network. The method might further comprise establishing, via the one or more WAN antennas, wireless communications with one or more user devices associated with one or more customers in the identified at least one geographic area; and providing the one or more user devices with network access to the telecommunications network via the one or more WAN antennas, the mobile wireless base station, the at least one service provider network antenna, and the at least one wireless network node. In some cases, each of the one or more user devices might comprise one of a laptop computer, a tablet computer, a smart phone, a mobile phone, a personal digital assistant, a set-top box, a video recording or playback device, an audio recording or playback device, or a portable gaming device, and/or the like.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: identify at least one geographic area having at least one of weak wireless communications coverage or non-existent wireless communications coverage; deploy one or more vehicles to the identified at least one geographic area, each of the one or more vehicles comprising a mobile wireless base station; and establish wireless network communications between the mobile wireless base station of at least one vehicle of the one or more vehicles and at least one wireless network node of a telecommunications network that is one of proximate to or within the at least one geographic area.

In some embodiments, the apparatus might comprise at least one of one or more vehicle processors disposed in each of the one or more vehicles, one or more processors disposed in a user device associated with an operator of a service provider, a server computer, a distributed computing system, or a cloud computing system, and/or the like.

According to some embodiments, each of the one or more vehicles might comprise one of a manned vehicle or an unmanned vehicle, and/or the like. In some instances, each manned vehicle might comprise one of a car, a motorcycle, an all-terrain vehicle, a truck, a van, a semi-trailer truck, an aircraft, or a water craft, and/or the like. In some cases, each unmanned vehicle might comprise one of an aerial drone, a land-based drone, a water-based drone, or an autonomous vehicle, and/or the like. Merely by way of example, in some instances, at least one of the one or more vehicles might comprise an inductive charging system that charges via inductive power transfer from one or more charging pads in a corresponding charging platform.

In some embodiments, the wireless network communications might be based on wireless communications protocols or standards comprising at least one of 2G standard, 3G standard, 4G standard, 5G standard, Wi-Fi standard, Z-wave standard, ZigBee standard, LoRa standard, or random phase multiple access ("RPMA") standard, and/or the like. In some cases, the wireless network communications might comprise at least one of a wireless mesh, a point-to-point wireless communications link, a point-to-multi-point wireless communications link, optical link technology, or a microwave link, and/or the like. In some instances, the at least one wireless network node comprises a wireless access point ("WAP"), or the like.

According to some embodiments, the at least one vehicle might further comprise an omnidirectional antenna, where establishing the wireless network communications between the mobile wireless base station of the at least one vehicle of the one or more vehicles and the at least one wireless network node of the telecommunications network might comprise establishing, with the second computing system and via the omnidirectional antenna, an omnidirectional wireless communications link between the mobile wireless base station of the at least one vehicle and the at least one wireless network node of the telecommunications network.

Alternatively, or additionally, the at least one vehicle might further comprise a non-omnidirectional antenna, where establishing the wireless network communications between the mobile wireless base station of the at least one vehicle of the one or more vehicles and the at least one wireless network node of the telecommunications network might comprise establishing, with the second computing system and via the non-omnidirectional antenna, a directional wireless communications link between the mobile wireless base station of the at least one vehicle and the at least one wireless network node of the telecommunications network. In some instances, the non-omnidirectional antenna comprises a self-adjusting antenna that maintains optimum signal connectivity with the at least one wireless network node.

In some embodiments, the at least one vehicle might further comprise one or more wide area network ("WAN") antennas and at least one service provider network antenna, where establishing the wireless network communications between the mobile wireless base station of the at least one vehicle and the at least one wireless network node of the telecommunications network might comprise establishing, via the at least one service provider network antenna, the wireless network communications between the mobile wireless base station of the at least one vehicle and the at least one wireless network node of the telecommunications network. The set of instructions, when executed by the at least one processor, might further cause the apparatus to establish, via the one or more WAN antennas, wireless communications with one or more user devices associated with one or more customers in the identified at least one geographic area; and provide the one or more user devices with network access to the telecommunications network via the one or more WAN antennas, the mobile wireless base station, the at least one service provider network antenna, and the at least one wireless network node. In some cases, each of the one or more user devices might comprise one of a laptop computer, a tablet computer, a smart phone, a mobile phone, a personal digital assistant, a set-top box, a video recording or playback device, an audio recording or playback device, or a portable gaming device, and/or the like.

In yet another aspect, a system might comprise a computing system and one or more vehicles. The computing system might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: identify at least one geographic area having at least one of weak wireless communications coverage or non-existent wireless communications coverage; and send one or more command instructions to one or more vehicles to deploy the one or more vehicles to the identified at least one geographic area. Each of the one or more vehicles might comprise a propulsion system; a mobile wireless base station; at least one second processor; and a second non-transitory computer readable medium communicatively coupled to the at least one second processor. The second non-transitory computer readable medium might have stored thereon computer software comprising a second set of instructions that, when executed by the at least one second processor, causes the vehicle to: receive the one or more command instructions; and send instructions to the propulsion system to move the vehicle to particular coordinates in the identified at least one geographic area, based on the received one or more command instructions. The first set of instructions, when executed by the at least one first processor, might further cause the computing system to: establish wireless network communications between the mobile wireless base station of at least one vehicle of the one or more vehicles and at least one wireless network node of a telecommunications network that is proximate to the at least one geographic area. In some embodiments, the second set of instructions, when executed by the at least one second processor, might further cause the vehicle to: relay wireless network communications, via the mobile wireless base station, between the at least one wireless network node of the telecommunications network and one or more user devices located within the identified at least one geographic area.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing wireless communications, and, more particularly, to methods, systems, and apparatuses for implementing ad hoc wireless capacity modification, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing ad hoc wireless capacity modification, in accordance with various embodiments.

In the non-limiting embodiment of FIG. 1, system 100 might comprise a vehicle 105 (which might be among a plurality of vehicles 105). The vehicle 105 might be located within or deployed to geographic area 110 (e.g., a residential neighborhood, a business center, an office park, a portion of a city or town, a transit station or depot, etc.). Within the geographic area 110 might be one or more user devices 115a, 115b, through 115n (collectively, "user devices 115" or the like). Each vehicle 105 might comprise a processor(s) 120, database(s) 125, wireless base station(s) 130, wide area network ("WAN") antenna(s) 135, service provider antenna(s) 140, and power source(s) 145, and/or the like. In some cases, processor 120 might communicatively couple to database 125 and base station 130. The power source 145 might provide electrical power to processor 120, base station 130, WAN antenna 135, service provider antenna 140, and/or the like. The base station 130 might communicatively couple to WAN antenna 135 and service provider network antenna 140.

Each power source 145 might comprise one or more charging pads 145a and one or more batteries 145b, and/or the like. According to some embodiments, system 100 might comprise a platform 150 (which might be among a plurality of platforms 150). Each platform 150 (which can be ground-level, slightly elevated, on top of/near the top of a pole (e.g., utility pole, telephone pole, or the like), or on top of a building, etc.) might comprise one or more charging pads 150a and one or more power sources 150b, and/or the like. System 100 might comprise one or more wireless network nodes 155, one or more telecommunications networks 160, computing system(s) 165, and database(s) 170, and/or the like.

In operation, at least one of processor(s) 120, wireless network node(s) 155, and/or computing system(s) 165 might identify at least one geographic area (e.g., geographic area 110 or the like) having at least one of weak wireless communications coverage or non-existent wireless communications coverage, might deploy one or more vehicles (e.g., one or more of vehicles 105 or the like) to the identified at least one geographic area (e.g., geographic area 110 or the like), and might establish wireless network communications between the mobile wireless base station (e.g., wireless base station 130 or the like) of at least one vehicle (e.g., of the one or more vehicles 105 or the like) and at least one wireless network node (e.g., wireless network node 155 or the like) of a telecommunications network (e.g., network 160 or the like), where the at least one wireless network node might be one of proximate to or within the at least one geographic area.

In some embodiments, the at least one of processor(s) 120, wireless network node(s) 155, and/or computing system(s) 165 might each comprise at least one of one or more vehicle processors 120 disposed in each of the one or more vehicles 105, one or more processors disposed in a user device 115 associated with an operator of a service provider, a server computer, a distributed computing system, or a cloud computing system, and/or the like. Merely by way of example, in some cases, each of the one or more vehicles 105 might include, without limitation, one of a manned vehicle or an unmanned vehicle. In some instances, each manned vehicle might include, but is not limited to, one of a car, a motorcycle, an all-terrain vehicle, a truck, a van, a semi-trailer truck, an aircraft, or a water craft, and/or the like. In some cases, each unmanned vehicle might include, without limitation, one of an aerial drone, a land-based drone, a water-based drone, or an autonomous vehicle, and/or the like.

According to some embodiments, at least one of the one or more vehicles 105 might comprise an inductive charging system that charges via inductive power transfer between one or more charging pads 145a of power source 145 and one or more charging pads 150a of a corresponding charging platform 150, as depicted by diamond-ended dashed line 150c. In some embodiments, alternative to the inductive charging system, other charging systems might include, without limitation, contact charging system (e.g., in which charging pads 145a and 150a might comprise electrical contacts that when in physical contact with each other might allow electrical charging to the vehicle 105, as depicted by diamond-ended dashed line 150c, or the like). In some instances, multiple charging pads on each of the vehicle 105 and the platform 150 (whether inductive or contact-based, or the like) might be provided to allow for zonal charging, thereby improving (i.e., reducing) the time it takes to recharge the battery 145b on the vehicle 105. In some embodiments, the platform 150 might perform authentication (via wireless communication or the like) prior to allowing wireless charging of a vehicle 105 that was docked with the platform 150. In essence, the vehicle (such as a drone or the like) would be authenticated, and once authorized, a digital switch would be used to control power to the charging pad(s) 150a. This would prevent unauthorized power use and would open up the platform to support multiple service providers. Several technologies may be employed to perform authentication, authorization, and/or accounting, including, but not limited to, radius, Wi-Fi WPA-2, and/or the like. In some cases, the inductive charging system might comprise an authentication system. The method might further comprise authenticating, with the inductive charging system, the at least one vehicle to determine whether the at least one vehicle is authorized to be charged; based on a determination that the at least one vehicle is authorized to be charged, activating, with the inductive charging system, the one or more charging pads to cause the one or more charging pads to charge one or more batteries of the at least one vehicle; and based on a determination that the at least one vehicle is unauthorized to be charged, preventing, with the inductive charging system, the one or more charging pads from charging the at least one vehicle.

Merely by way of example, in some cases, the wireless network communications might be based on wireless communications protocols or standards including, but not limited to, at least one of 2G standard, 3G standard, 4G standard, 5G standard, Wi-Fi standard, Z-wave standard, ZigBee standard, LoRa standard, or random phase multiple access ("RPMA") standard, and/or the like. In some instances, the wireless network communications might include, without limitation, at least one of a wireless mesh, a point-to-point wireless communications link, a point-to-multi-point wireless communications link, optical link technology (e.g., Li-Fi, or other optical link technology or the like), or a microwave link, and/or the like. In some embodiments, the at least one wireless network node might comprise a wireless access point ("WAP") or the like.

In some embodiments, establishing the wireless network communications between the mobile wireless base station 130 of the at least one vehicle 105 and the at least one wireless network node 155 of the telecommunications network(s) 160 might comprise establishing, via the at least one service provider network antenna 140, the wireless network communications between the mobile wireless base station 130 of the at least one vehicle 105 and the at least one wireless network node 155 of the telecommunications network(s) 160, as depicted by the lightning bolt symbol between the at least one service provider network antenna 140 and the at least one wireless network node 155. In some instances, the at least one of processor(s) 120, wireless network node(s) 155, and/or computing system(s) 165 might comprise establishing, via the one or more WAN antennas 135, wireless communications with one or more user devices 115 associated with one or more customers in the identified at least one geographic area 110, as depicted by the lightning bolt symbols between the at least one WAN antenna 135 and each of the one or more user devices 115, and providing the one or more user devices 115 with network access to the telecommunications network(s) 160 via the one or more WAN antennas 135, the mobile wireless base station 130, the at least one service provider network antenna 140, and the at least one wireless network node(s) 155.

According to some embodiments, each of the one or more user devices 115 might include, without limitation, one of a laptop computer, a tablet computer, a smart phone, a mobile phone, a personal digital assistant, a set-top box, a video recording and/or playback device, an audio recording and/or playback device, or a portable gaming device, and/or the like.

In some embodiments, the at least one vehicle 110 might further comprise an omnidirectional antenna(s) or the like—that is, at least one of the WAN antenna 135 or the service provider network antenna 140, or the like, might comprise an omnidirectional antenna(s) or the like. In some cases, establishing the wireless network communications between the mobile wireless base station 130 of the at least one vehicle 105 of the one or more vehicles and the at least one wireless network node 155 of the telecommunications network(s) 160 might comprise establishing, via the omnidirectional antenna, an omnidirectional wireless communications link between the mobile wireless base station 130 of the at least one vehicle 105 and the at least one wireless network node 155 of the telecommunications network(s) 160, as depicted by the lightning bolt symbol between service provider network antenna 140 (which, in this case, might be an omnidirectional antenna(s) or the like).

In alternative (or additional) embodiments, the at least one vehicle 110 might further comprise a non-omnidirectional antenna(s) or the like—that is, at least one of the WAN antenna 135 or the service provider network antenna 140, or the like, might comprise a non-omnidirectional antenna(s) or the like. In some instances, establishing the wireless network communications between the mobile wireless base station 130 of the at least one vehicle 105 of the one or more vehicles and the at least one wireless network node 155 of the telecommunications network(s) 160 might comprise establishing, via the non-omnidirectional antenna, a directional wireless communications link between the mobile wireless base station 130 of the at least one vehicle 105 and the at least one wireless network node 155 of the telecommunications network(s) 160, as depicted by the lightning bolt symbol between service provider network antenna 140 (which, in this case, might be a non-omnidirectional antenna(s) or the like). In some cases, the non-omnidirectional antenna(s) might comprise a self-adjusting antenna that maintains optimum signal connectivity with the at least one wireless network node 155.

According to some embodiments, a land vehicle or an airborne drone might be equipped with a wireless base station, which would establish a mobile wireless network. The base station might be connected to a remote network (e.g., service provider network, telecommunications network, Internet, etc.) through a wireless connection, which could utilize at least one of wireless mesh, point-to-point wireless, point-to-multi-point wireless, optical link technology (e.g., Li-Fi, or other optical link technology or the like), microwave, or other wireless technology, or the like. In a non-omnidirectional wireless solution, given the mobility of the solution, a self-adjusting antenna that maintains optimum signal connectivity to the remote network may be employed. This solution could be implemented using logic in the vehicle or drone such that optimal signal connectivity is maintained (i.e., the antenna is fixed, but the body of the vehicle or drone may be positioned/repositioned to point to a wireless access point or wireless network node of the remote network, or the like). The wireless technology may be variable and could be 2G/3G/4G/5G, Wi-Fi, Z-wave, ZigBee, LoRa, RPMA, or other wireless technology, a drone-enable solution may contain an inductive wireless charging solution, where one or more charging pads in a charging platform and also one or more charging pads on the drone might be used to charge the drone via inductive power transfer. Inductive charging allows for remote charging without human intervention, thus allowing for autonomous or remote-controlled operations of the drones or the like.

The various embodiments described above with respect to FIG. 1 thus provide the following benefits or advantages: the various embodiments augment wireless capacity where coverage is weak; and the various embodiments provide wireless capacity where no wireless coverage is currently available.

Figure 2:
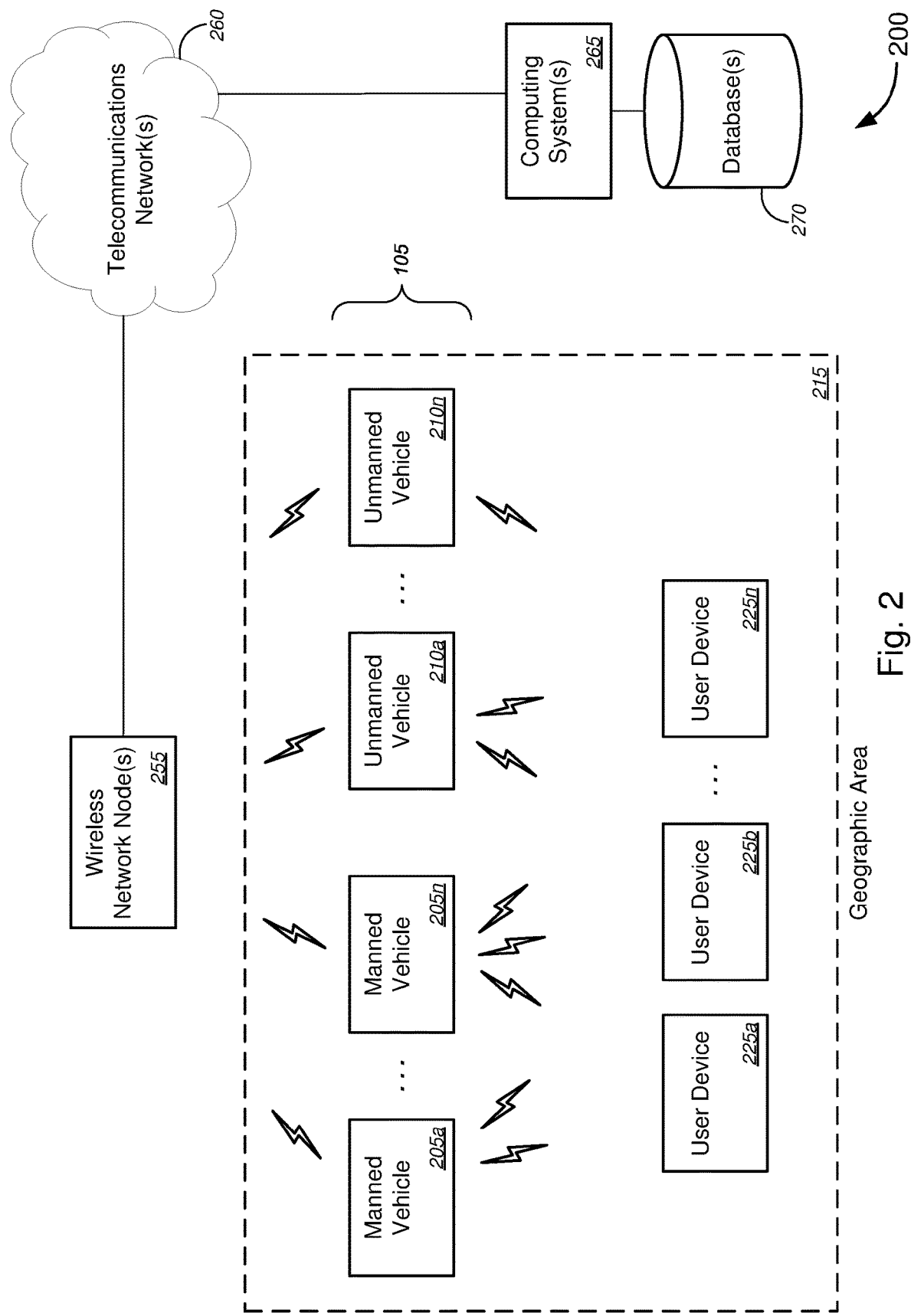
FIG. 2 is a schematic diagram illustrating another system for implementing ad hoc wireless capacity modification, in accordance with various embodiments.

FIG. 2 is a schematic diagram illustrating another system 200 for implementing ad hoc wireless capacity modification, in accordance with various embodiments.

In the non-limiting embodiment of FIG. 2, system 200 might comprise one or more manned vehicles 205a-205n (collectively, "manned vehicles 205" or the like) and/or one or more unmanned vehicles 210a-210n (collectively, "unmanned vehicles 210" or the like). In some cases, the manned vehicles 205 and the unmanned vehicles 210 might collectively constitute one or more vehicles 105. At least one vehicle 105 of the one or more vehicles 105 might be one of proximate to or within the at least one geographic area 215. In some instances, each manned vehicle 205 might include, but is not limited to, one of a car, a motorcycle, an all-terrain vehicle, a truck, a van, a semi-trailer truck, an aircraft, or a water craft, and/or the like. In some cases, each unmanned vehicle 210 might include, without limitation, one of an aerial drone, a land-based drone, a water-based drone, or an autonomous vehicle, and/or the like.

System 200 might further comprise one or more user devices 225a, 225b, through 225n (collectively, "user devices 225" or the like). System 200 might further comprise one or more wireless network nodes 255, one or more telecommunications networks 260, one or more computing systems 265, and one or more databases 270, and/or the like.

In operation, one or more of at least one vehicle 105, wireless network node(s) 255, and/or computing system(s) 265 might identify at least one geographic area (e.g., geographic area 215 or the like) having at least one of weak wireless communications coverage or non-existent wireless communications coverage, might deploy one or more vehicles (e.g., one or more of vehicles 105) to the identified at least one geographic area (e.g., geographic area 215 or the like), and might establish wireless network communications between the mobile wireless base station of at least one vehicle (e.g., of the one or more vehicles 105 or the like) and at least one wireless network node (e.g., wireless network node 255 or the like) of a telecommunications network (e.g., network 260 or the like), where the at least one wireless network node might be one of proximate to or within the at least one geographic area.

In some embodiments, one or more of at least one vehicle 105, wireless network node(s) 255, and/or computing system(s) 265 might each comprise at least one of one or more vehicle processors disposed in each of the one or more vehicles 105, one or more processors disposed in a user device 225 associated with an operator of a service provider, a server computer, a distributed computing system, or a cloud computing system, and/or the like.

Merely by way of example, in some cases, the wireless network communications might be based on wireless communications protocols or standards including, but not limited to, at least one of 2G standard, 3G standard, 4G standard, 5G standard, Wi-Fi standard, Z-wave standard, ZigBee standard, LoRa standard, or random phase multiple access ("RPMA") standard, and/or the like. In some instances, the wireless network communications might include, without limitation, at least one of a wireless mesh, a point-to-point wireless communications link, a point-to-multi-point wireless communications link, optical link technology, or a microwave link, and/or the like. In some embodiments, the at least one wireless network node might comprise a wireless access point ("WAP") or the like.

The one or more vehicles 105, the geographic area 215, the one or more user devices 225, the one or more wireless network nodes 255, the one or more telecommunications networks 260, the one or more computing systems 265, and the one or more databases 270 of system 200 of FIG. 2 might otherwise be the same as, or similar to, the vehicle(s) 105, the geographic area 110, the one or more user devices 115, the one or more wireless network nodes 155, the one or more telecommunications networks 160, the one or more computing systems 165, and the one or more databases 170, respectively, of system 100 of FIG. 1, and similar descriptions apply to the components of system 200 of FIG. 2.

Figure 3:
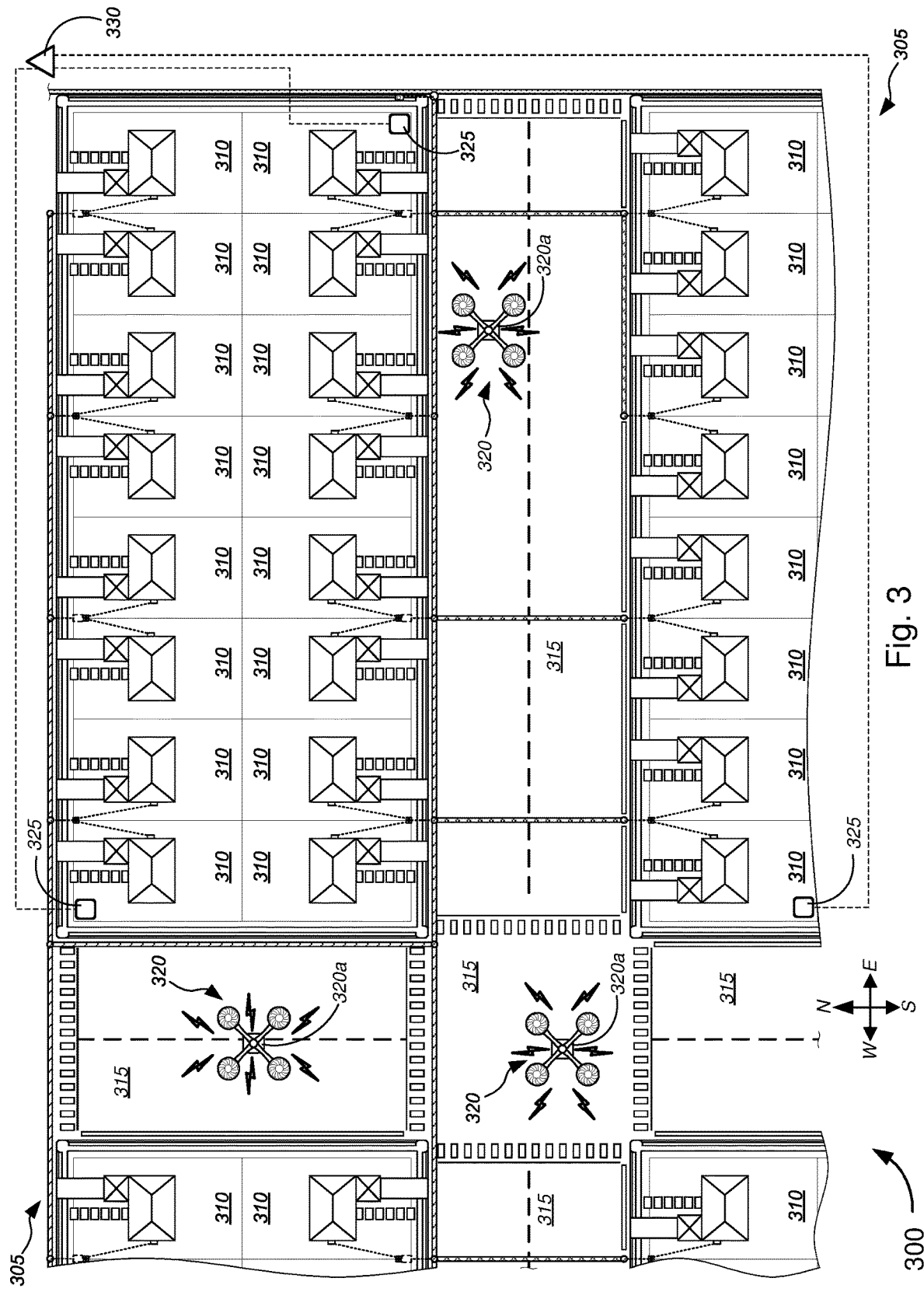
FIG. 3 is a schematic diagram illustrating a non-limiting embodiment for implementing ad hoc wireless capacity modification.

FIG. 3 is a schematic diagram illustrating a non-limiting embodiment 300 for implementing ad hoc wireless capacity modification. Embodiment 300 might comprise a plurality of customer premises 310 located within a geographic area 305. The customer premises 310 might each be adjacent to a roadway 315. Embodiment 300 might further comprise one or more vehicles 320, each including, without limitation, one of a manned vehicle or an unmanned vehicle. In some instances, each manned vehicle might include, but is not limited to, one of a car, a motorcycle, an all-terrain vehicle, a truck, a van, a semi-trailer truck, an aircraft, or a water craft, and/or the like. In some cases, each unmanned vehicle might include, without limitation, one of an aerial drone, a land-based drone, a water-based drone, or an autonomous vehicle, and/or the like. In the non-limiting embodiment of FIG. 3, the vehicles 320 are depicted as aerial drones (for purposes of illustration). Embodiment 300 might further comprise one or more platforms 325 on which the aerial drones 320 might land (or otherwise connect or make contact with), via which the aerial drones 320 might recharge, and/or with or via which the aerial drones 320 might wirelessly communicate so as to communicate with one or more wireless network nodes or wireless access points 330 (which are shown to communicatively couple with each platform 325 via dotted lines in FIG. 3). In some cases, the vehicles 320 might wirelessly communicate directly with the one or more wireless network nodes 330 (as depicted by the lightning bolt symbols around each vehicle 320).

For simplifying the illustration, the customer premises 310 are shown to be in a grid-like block pattern, and are shown to be of similar design and build. The grid-like block of customer premises is also shown to be oriented along particular cardinal directions (i.e., north, south, east, and west), as indicated in FIG. 3. However, the various embodiments are not so limited, and any arrangement of customer premises (of any variety of sizes and builds) may be applicable, in any arrangement or orientation with respect to the cardinal directions, as appropriate or desired. Moreover, the tools and techniques described herein may be implemented for established neighborhoods/blocks of customer premises or newly constructed ones.

Further, although FIG. 3 shows a plurality of customer premises that are single-family home residences within a neighborhood setting, the various embodiments are not so limited, and the various systems and methods described with respect to FIG. 3 may be applicable to any arrangement and type of customer premises (including, without limitation, customer residences, multi-dwelling units ("MDUs"), commercial customer premises, industrial customer premises, and/or the like) within one or more blocks of customer premises (e.g., residential neighborhoods, university/college campuses, office blocks, industrial parks, mixed-use zoning areas, and/or the like), in which roadways and/or pathways might be adjacent to each of the customer premises. Moreover, the embodiment as shown in FIG. 3 is not necessarily to scale, as the vehicles 320 (depicted as aerial drones in this embodiment) and the platforms 325 are enlarged relative to the customer premises 310 for clarity of illustration.

The one or more vehicles 320, the geographic area 305, the one or more platforms 325, and the wireless network node 330 of system 300 of FIG. 3 might otherwise be the same as, or similar to, the vehicle(s) 105, the geographic area 110, the one or more platforms 150, and the one or more wireless network nodes 155, respectively, of system 100 of FIG. 1, and similar descriptions apply to the components of system 300 of FIG. 3.

Figure 4A:
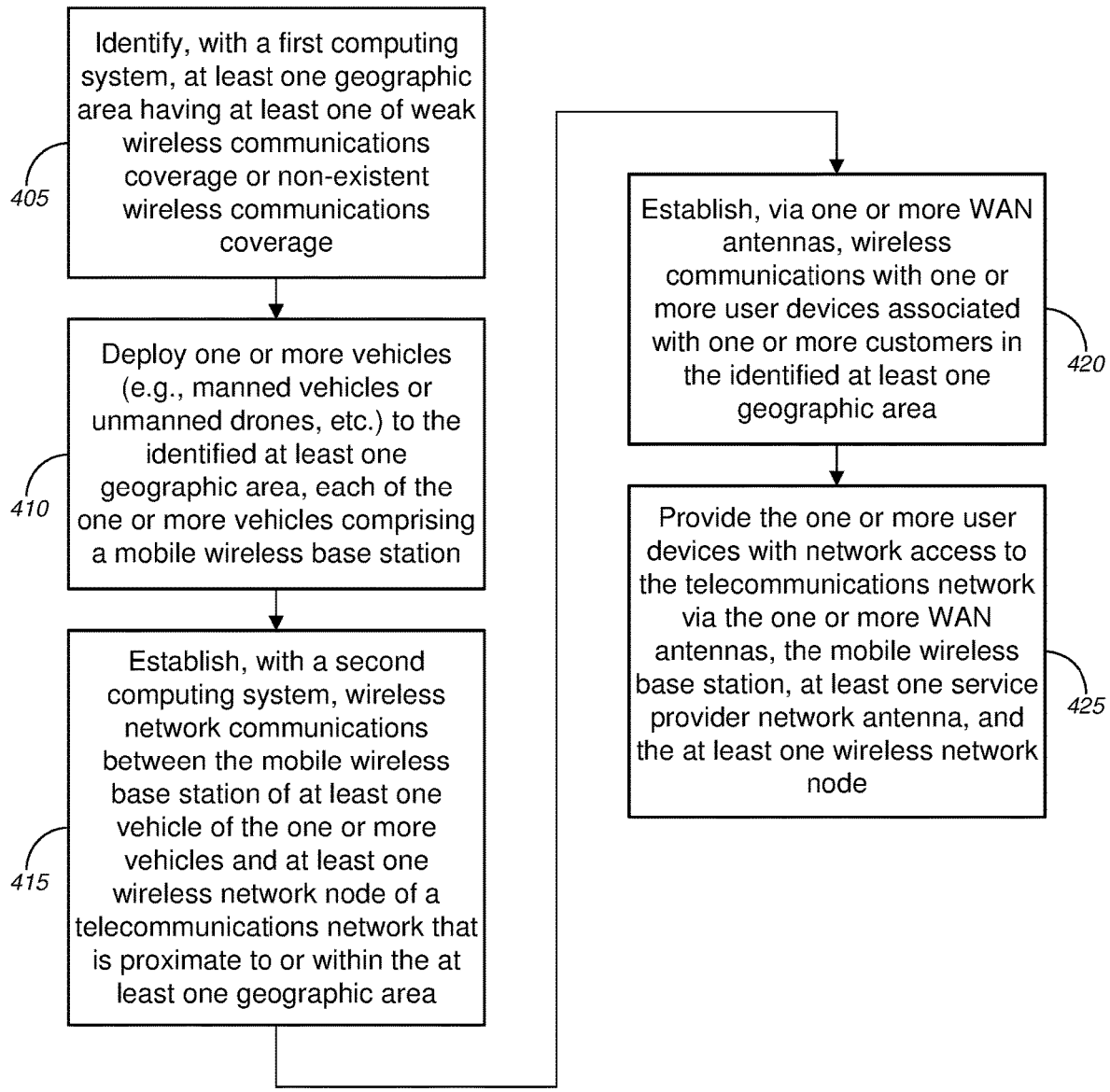
FIGS. 4A and 4B are flow diagrams illustrating a method for implementing ad hoc wireless capacity modification, in accordance with various embodiments.
Figure 4B:
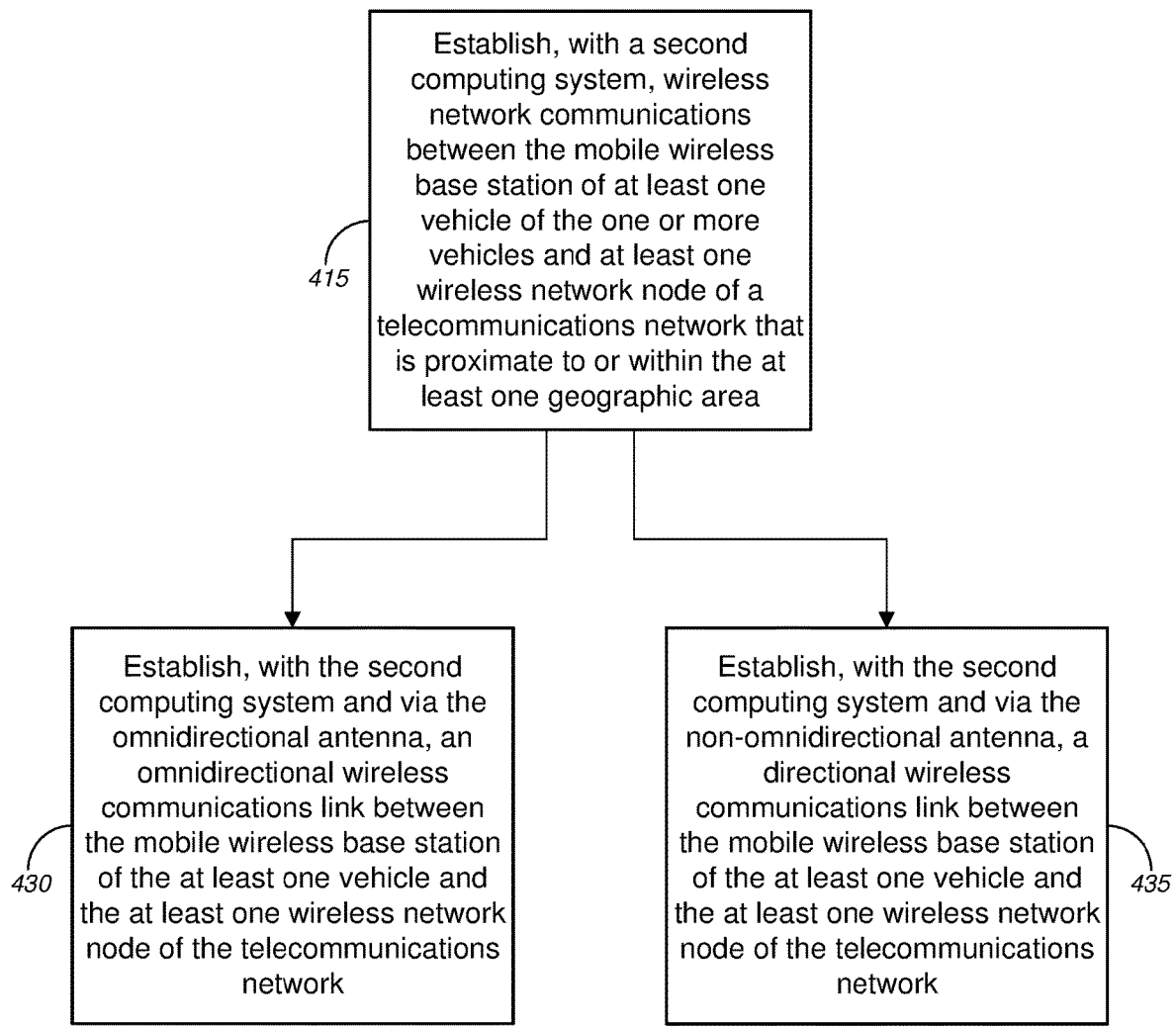

FIGS. 4A and 4B (collectively, "FIG. 4") are flow diagrams illustrating a method 400 for implementing ad hoc wireless capacity modification, in accordance with various embodiments.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems 100, 200, and 300 of FIGS. 1, 2, and 3, respectively (or components thereof), such methods may also be implemented using any suitable hardware (or software) implementation. Similarly, while each of the systems 100, 200, and 300 of FIGS. 1, 2, and 3, respectively (or components thereof), can operate according to the method 400 illustrated by FIG. 4 (e.g., by executing instructions embodied on a computer readable medium), the systems 100, 200, and 300 of FIGS. 1, 2, and 3 can each also operate according to other modes of operation and/or perform other suitable procedures.

In the non-limiting embodiment of FIG. 4A, method 400, at block 405, might comprise identifying, with a first computing system, at least one geographic area having at least one of weak wireless communications coverage or non-existent wireless communications coverage. At block 410, method 400 might comprise deploying one or more vehicles to the identified at least one geographic area, each of the one or more vehicles comprising a mobile wireless base station. Method 400 might further comprise establishing, with a second computing system, wireless network communications between the mobile wireless base station of at least one vehicle of the one or more vehicles and at least one wireless network node of a telecommunications network that is one of proximate to or within the at least one geographic area.

In some embodiments, each of the first computing system and the second computing system might comprise at least one of one or more vehicle processors disposed in each of the one or more vehicles, one or more processors disposed in a user device associated with an operator of a service provider, a server computer, a distributed computing system, or a cloud computing system, and/or the like. In some cases, the first computing system and the second computing system might be the same computing system. Merely by way of example, in some cases, each of the one or more vehicles might include, without limitation, one of a manned vehicle or an unmanned vehicle. In some instances, each manned vehicle might include, but is not limited to, one of a car, a motorcycle, an all-terrain vehicle, a truck, a van, a semi-trailer truck, an aircraft, or a water craft, and/or the like. In some cases, each unmanned vehicle might include, without limitation, one of an aerial drone, a land-based drone, a water-based drone, or an autonomous vehicle, and/or the like. According to some embodiments, at least one of the one or more vehicles might comprise an inductive charging system that charges via inductive power transfer from one or more charging pads in a corresponding charging platform.

Merely by way of example, in some cases, the wireless network communications might be based on wireless communications protocols or standards including, but not limited to, at least one of 2G standard, 3G standard, 4G standard, 5G standard, Wi-Fi standard, Z-wave standard, ZigBee standard, LoRa standard, or random phase multiple access ("RPMA") standard, and/or the like. In some instances, the wireless network communications might include, without limitation, at least one of a wireless mesh, a point-to-point wireless communications link, a point-to-multi-point wireless communications link, optical link technology (e.g., Li-Fi, or other optical link technology or the like), or a microwave link, and/or the like. In some embodiments, the at least one wireless network node might comprise a wireless access point ("WAP") or the like.

According to some embodiments, the at least one vehicle might further comprise one or more wide area network ("WAN") antennas and at least one service provider network antenna. Establishing the wireless network communications between the mobile wireless base station of the at least one vehicle and the at least one wireless network node of the telecommunications network might comprise establishing, with the second computing system and via the at least one service provider network antenna, the wireless network communications between the mobile wireless base station of the at least one vehicle and the at least one wireless network node of the telecommunications network. Method 400 might further comprise establishing, via the one or more WAN antennas, wireless communications with one or more user devices associated with one or more customers in the identified at least one geographic area (block 420), and providing the one or more user devices with network access to the telecommunications network via the one or more WAN antennas, the mobile wireless base station, the at least one service provider network antenna, and the at least one wireless network node (block 425).

According to some embodiments, each of the one or more user devices might include, without limitation, one of a laptop computer, a tablet computer, a smart phone, a mobile phone, a personal digital assistant, a set-top box, a video recording or playback device, an audio recording or playback device, or a portable gaming device, and/or the like.

With reference to FIG. 4B, the at least one vehicle, according to some embodiments, might further comprise an omnidirectional antenna. In some cases, establishing the wireless network communications between the mobile wireless base station of the at least one vehicle of the one or more vehicles and the at least one wireless network node of the telecommunications network (at block 415) might comprise establishing, with the second computing system and via the omnidirectional antenna, an omnidirectional wireless communications link between the mobile wireless base station of the at least one vehicle and the at least one wireless network node of the telecommunications network (block 430).

In some embodiments, the at least one vehicle might further comprise a non-omnidirectional antenna. In some instances, establishing the wireless network communications between the mobile wireless base station of the at least one vehicle of the one or more vehicles and the at least one wireless network node of the telecommunications network (at block 415) might comprise establishing, with the second computing system and via the non-omnidirectional antenna, a directional wireless communications link between the mobile wireless base station of the at least one vehicle and the at least one wireless network node of the telecommunications network (block 435). In some cases, the non-omnidirectional antenna might comprise a self-adjusting antenna that maintains optimum signal connectivity with the at least one wireless network node.

Exemplary System and Hardware Implementation

Figure 5:
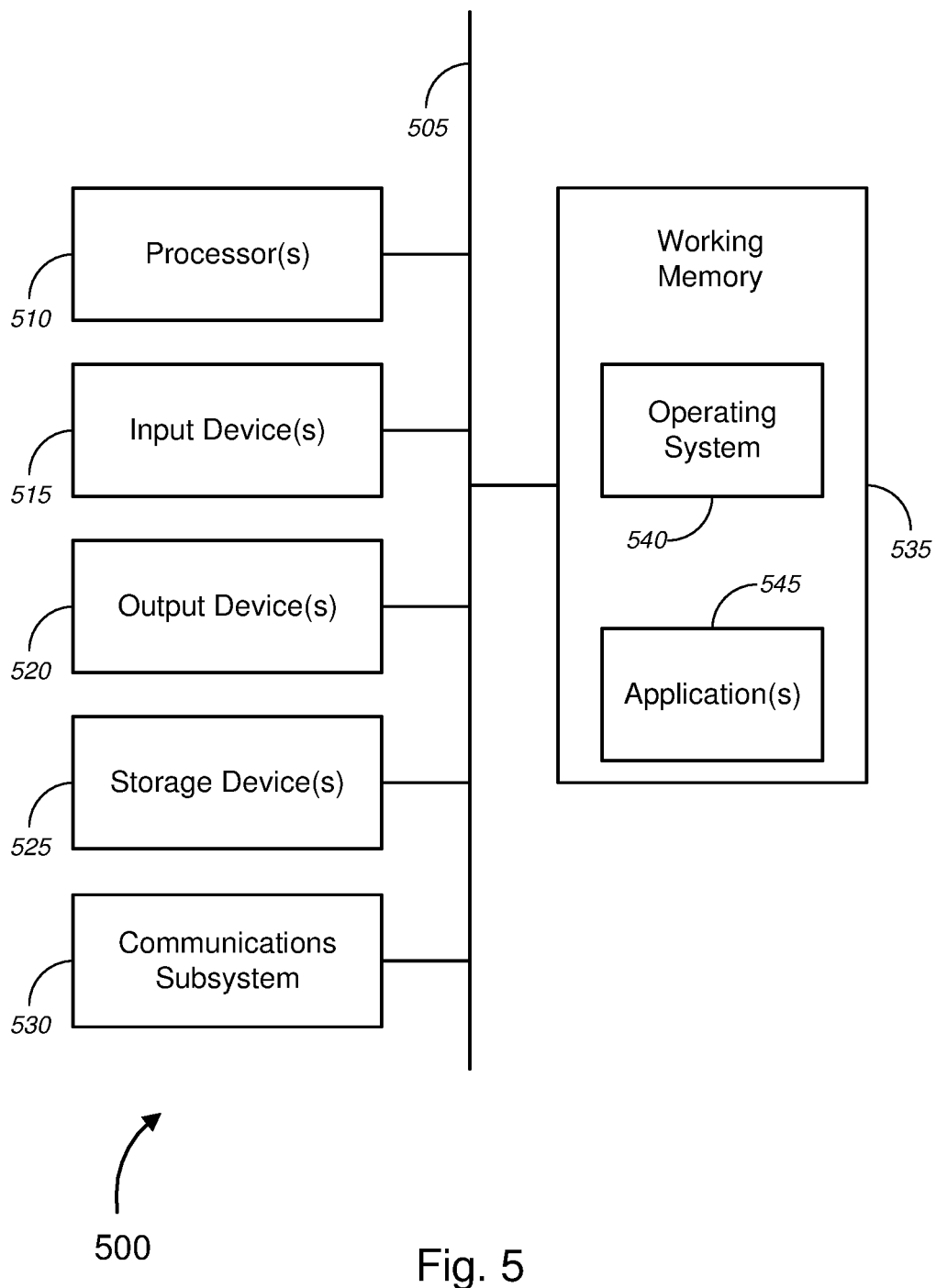
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., vehicle 105, 205a-205n, 210a-210n, and 320, user devices 115a-115n and 225a-225n, platform 150 and 325, wireless network node 155, 255, and 330, and computing system(s) 165 and 265, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., vehicle 105, 205a-205n, 210a-210n, and 320, user devices 115a-115n and 225a-225n, platform 150 and 325, wireless network node 155, 255, and 330, and computing system(s) 165 and 265, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
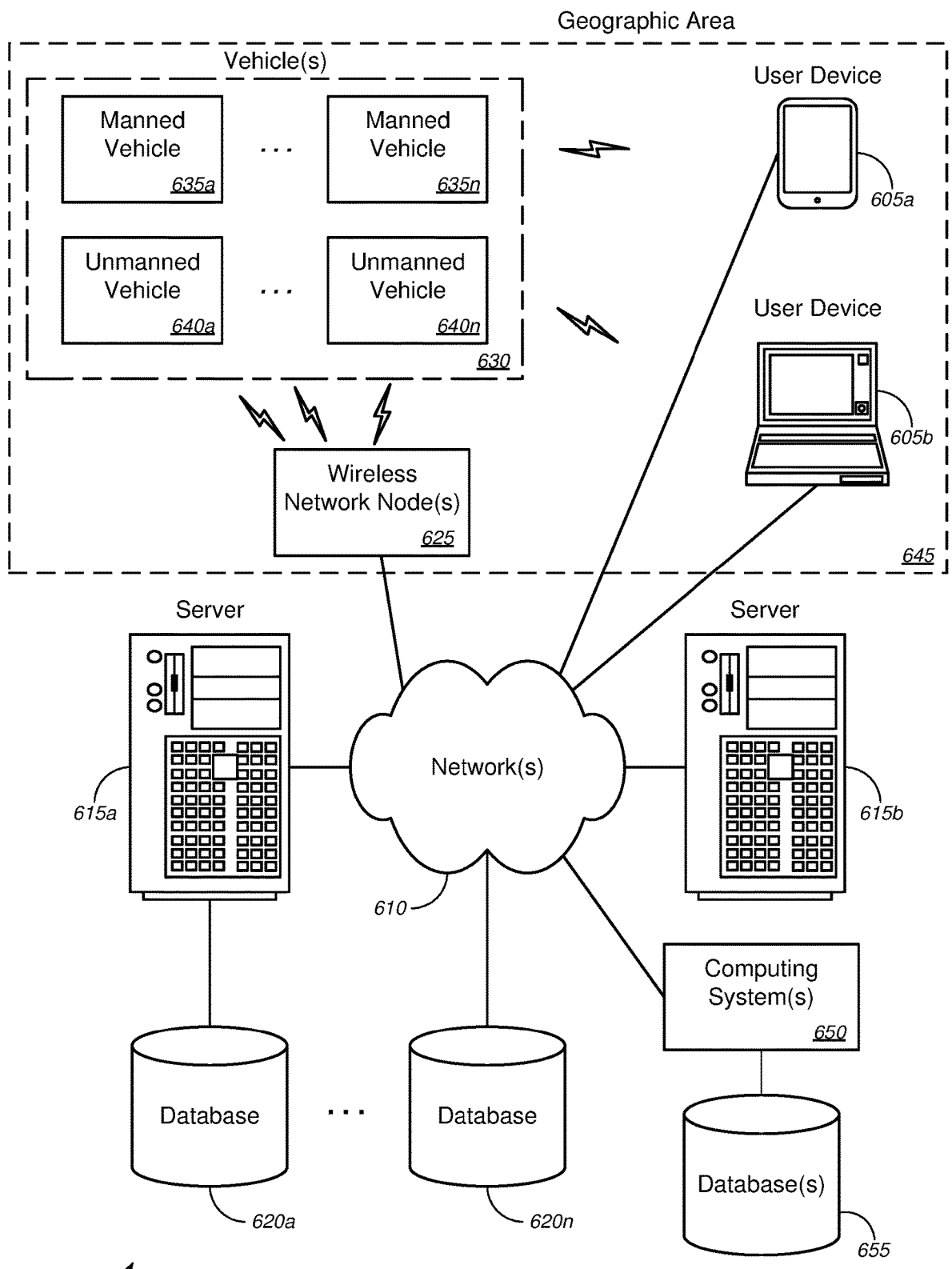
FIG. 6 is a block diagram illustrating a networked system of computers, computing systems, or system hardware architecture, which can be used in accordance with various embodiments.

As noted above, a set of embodiments comprises methods and systems for implementing wireless communications, and, more particularly, to methods, systems, and apparatuses for implementing ad hoc wireless capacity modification. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 160 in FIGS. 1 and 260 in FIG. 2, or the like) can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C #™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing wireless communications, and, more particularly, to methods, systems, and apparatuses for implementing ad hoc wireless capacity modification, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise wireless network node 625, one or more vehicle(s) 630 (which comprises one or more manned vehicles 635a-635n (collectively, "manned vehicles 635" or the like), one or more unmanned vehicles 640a-640n (collectively, "unmanned vehicles 640" or the like), some or all of which (together with user devices 605a or 605b) might be disposed within or might be deployed to geographic area 645. System 600 might further comprise computing system 650 and corresponding database(s) 655. In some embodiments, each of the one or more vehicles might comprise one of a manned vehicle or an unmanned vehicle, and/or the like. In some cases, each manned vehicle might comprise one of a car, a motorcycle, an all-terrain vehicle, a truck, a van, a semi-trailer truck, an aircraft, or a water craft, and/or the like. In some instances, each unmanned vehicle might comprise one of an aerial drone, a land-based drone, a water-based drone, or an autonomous vehicle, and/or the like. According to some embodiments, each of the one or more user devices might comprise one of a laptop computer, a tablet computer, a smart phone, a mobile phone, a personal digital assistant, a set-top box, a video recording or playback device, an audio recording or playback device, or a portable gaming device, and/or the like.

In operation, at least one of server(s) 615, wireless network node(s) 625, at least one manned vehicle 635, at least one unmanned 640, and/or computing system(s) 650 might identify at least one geographic area (e.g., geographic area 645 or the like) having at least one of weak wireless communications coverage or non-existent wireless communications coverage, might deploy one or more vehicles to the identified at least one geographic area, and might establish wireless network communications between the mobile wireless base station of at least one vehicle of the one or more vehicles (e.g., the one or more vehicles 630 or the like) and at least one wireless network node (e.g., wireless network node 625 or the like) of a telecommunications network (e.g., network 610 or the like), where the at least one wireless network node might be one of proximate to or within the at least one geographic area.

In some embodiments, the at least one vehicle might further comprises one or more wide area network ("WAN") antennas and at least one service provider network antenna. In some instances, establishing the wireless network communications between the mobile wireless base station of the at least one vehicle 630 and the at least one wireless network node 625 of the telecommunications network 610 might comprise establish, via the at least one service provider network antenna, the wireless network communications between the mobile wireless base station of the at least one vehicle 630 and the at least one wireless network node 625 of the telecommunications network, as depicted by the lightning bolt symbols between the wireless network node(s) 625 and the vehicle(s) 630. The at least one of server(s) 615, wireless network node(s) 625, at least one manned vehicle 635, at least one unmanned 640, and/or computing system(s) 650 might establish, via the one or more WAN antennas, wireless communications with one or more user devices associated with one or more customers in the identified at least one geographic area 645, and might provide the one or more user devices 605 with network access to the telecommunications network 610 via the one or more WAN antennas, the mobile wireless base station, the at least one service provider network antenna, and the at least one wireless network node, and/or the like.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
identifying, with a first computing system, at least one geographic area having at least one of weak wireless communications coverage or non-existent wireless communications coverage;
deploying one or more vehicles to the identified at least one geographic area, each of the one or more vehicles comprising a mobile wireless base station; and
establishing, with a second computing system, wireless network communications between the mobile wireless base station of at least one vehicle of the one or more vehicles and at least one wireless network node of a telecommunications network that is one of proximate to or within the at least one geographic area, wherein the at least one vehicle further comprises one or more wide area network ("WAN") antennas and at least one service provider network antenna, wherein at least one WAN antenna of the one or more WAN antennas is communicatively coupled to the at least one service provider network antenna, and wherein the at least one WAN antenna communicatively coupled to the at least one service provider network antenna provides access to the telecommunications network for at least one device communicatively coupled to the at least one WAN antenna.

2. The method of claim 1, wherein each of the first computing system and the second computing system comprises at least one of one or more vehicle processors disposed in each of the one or more vehicles, one or more processors disposed in a user device associated with an operator of a service provider, a server computer, a distributed computing system, or a cloud computing system.

3. The method of claim 1, wherein the first computing system and the second computing system are the same computing system.

4. The method of claim 1, wherein each of the one or more vehicles comprises one of a manned vehicle or an unmanned vehicle, wherein each manned vehicle comprises one of a car, a motorcycle, an all-terrain vehicle, a truck, a van, a semi-trailer truck, an aircraft, or a water craft, wherein each unmanned vehicle comprises one of an aerial drone, a land-based drone, a water-based drone, or an autonomous vehicle.

5. The method of claim 1, wherein at least one vehicle of the one or more vehicles comprises an inductive charging system that charges via inductive power transfer from one or more charging pads in a corresponding charging platform.

6. The method of claim 5, wherein the inductive charging system comprises an authentication system, wherein the method further comprises:
authenticating, with the inductive charging system, the at least one vehicle to determine whether the at least one vehicle is authorized to be charged;
based on a determination that the at least one vehicle is authorized to be charged, activating, with the inductive charging system, the one or more charging pads to cause the one or more charging pads to charge one or more batteries of the at least one vehicle; and
based on a determination that the at least one vehicle is unauthorized to be charged, preventing, with the inductive charging system, the one or more charging pads from charging the at least one vehicle.

7. The method of claim 1, wherein the wireless network communications comprise at least one of a wireless mesh, a point-to-point wireless communications link, a point-to-multi-point wireless communications link, optical link technology, or a microwave link.

8. The method of claim 1, wherein the at least one vehicle further comprises an omnidirectional antenna, wherein establishing the wireless network communications between the mobile wireless base station of the at least one vehicle of the one or more vehicles and the at least one wireless network node of the telecommunications network comprises establishing, with the second computing system and via the omnidirectional antenna, an omnidirectional wireless communications link between the mobile wireless base station of the at least one vehicle and the at least one wireless network node of the telecommunications network.

9. The method of claim 1, wherein the at least one vehicle further comprises a non-omnidirectional antenna, wherein establishing the wireless network communications between the mobile wireless base station of the at least one vehicle of the one or more vehicles and the at least one wireless network node of the telecommunications network comprises establishing, with the second computing system and via the non-omnidirectional antenna, a directional wireless communications link between the mobile wireless base station of the at least one vehicle and the at least one wireless network node of the telecommunications network.

10. The method of claim 9, wherein the non-omnidirectional antenna comprises a self-adjusting antenna that maintains optimum signal connectivity with the at least one wireless network node.

11. The method of claim 1, wherein establishing the wireless network communications between the mobile wireless base station of the at least one vehicle and the at least one wireless network node of the telecommunications network comprises establishing, with the second computing system and via the at least one service provider network antenna, the wireless network communications between the mobile wireless base station of the at least one vehicle and the at least one wireless network node of the telecommunications network, wherein the method further comprises:
establishing, via the one or more WAN antennas, wireless communications with one or more user devices associated with one or more customers in the identified at least one geographic area; and
providing the one or more user devices with network access to the telecommunications network via the one or more WAN antennas, the mobile wireless base station, the at least one service provider network antenna, and the at least one wireless network node.

12. The method of claim 11, wherein each of the one or more user devices comprises one of a laptop computer, a tablet computer, a smart phone, a mobile phone, a personal digital assistant, a set-top box, a video recording or playback device, an audio recording or playback device, or a portable gaming device.

13. An apparatus, comprising:
at least one processor; and
a non-transitory computer readable medium communicatively coupled to the at least one processor, the non-transitory computer readable medium having stored thereon computer software comprising a set of instructions that, when executed by the at least one processor, causes the apparatus to:
   identify at least one geographic area having at least one of weak wireless communications coverage or non-existent wireless communications coverage;
   deploy one or more vehicles to the identified at least one geographic area, each of the one or more vehicles comprising a mobile wireless base station; and
   establish wireless network communications between the mobile wireless base station of at least one vehicle of the one or more vehicles and at least one wireless network node of a telecommunications network that is one of proximate to or within the at least one geographic area, wherein the at least one vehicle further comprises one or more wide area network ("WAN") antennas and at least one service provider network antenna, wherein at least one WAN antenna of the one or more WAN antennas is communicatively coupled to the at least one service provider network antenna, and wherein the at least one WAN antenna communicatively coupled to the at least one service provider network antenna provides access to the telecommunications network for at least one device communicatively coupled to the at least one WAN antenna.

14. The apparatus of claim 13, wherein the apparatus comprises at least one of one or more vehicle processors disposed in each of the one or more vehicles, one or more processors disposed in a user device associated with an operator of a service provider, a server computer, a distributed computing system, or a cloud computing system.

15. The apparatus of claim 13, wherein at least one of the one or more vehicles comprises an inductive charging system that charges via inductive power transfer from one or more charging pads in a corresponding charging platform.

16. The apparatus of claim 13, wherein the at least one vehicle further comprises an omnidirectional antenna, wherein establishing the wireless network communications between the mobile wireless base station of the at least one vehicle of the one or more vehicles and the at least one wireless network node of the telecommunications network comprises establishing, with the second computing system and via the omnidirectional antenna, an omnidirectional wireless communications link between the mobile wireless base station of the at least one vehicle and the at least one wireless network node of the telecommunications network.

17. The apparatus of claim 13, wherein the at least one vehicle further comprises a non-omnidirectional antenna, wherein establishing the wireless network communications between the mobile wireless base station of the at least one vehicle of the one or more vehicles and the at least one wireless network node of the telecommunications network comprises establishing, with the second computing system and via the non-omnidirectional antenna, a directional wireless communications link between the mobile wireless base station of the at least one vehicle and the at least one wireless network node of the telecommunications network.

18. The apparatus of claim 13, wherein establishing the wireless network communications between the mobile wireless base station of the at least one vehicle and the at least one wireless network node of the telecommunications network comprises establishing, via the at least one service provider network antenna, the wireless network communications between the mobile wireless base station of the at least one vehicle and the at least one wireless network node of the telecommunications network, wherein the set of instructions, when executed by the at least one processor, further causes the apparatus to:
   establish, via the one or more WAN antennas, wireless communications with one or more user devices associated with one or more customers in the identified at least one geographic area; and
   provide the one or more user devices with network access to the telecommunications network via the one or more WAN antennas, the mobile wireless base station, the at least one service provider network antenna, and the at least one wireless network node.

19. A system, comprising:
   a computing system, comprising:
      at least one first processor; and
      a first non-transitory computer readable medium communicatively coupled to the at least one first processor, the first non-transitory computer readable medium having stored thereon computer software comprising a first set of instructions that, when executed by the at least one first processor, causes the computing system to:
         identify at least one geographic area having at least one of weak wireless communications coverage or non-existent wireless communications coverage; and
         send one or more command instructions to one or more vehicles to deploy the one or more vehicles to the identified at least one geographic area; and
   the one or more vehicles, each vehicle comprising:
      a propulsion system;
      a mobile wireless base station;
      one or more wide area network ("WAN") antennas and at least one service provider network antenna, antenna, wherein at least one WAN antenna of the one or more WAN antennas is communicatively coupled to the at least one service provider network antenna, and wherein the at least one WAN antenna communicatively coupled to the at least one service provider network antenna provides access to a telecommunications network for at least one device communicatively coupled to the at least one WAN antenna;
      at least one second processor; and
      a second non-transitory computer readable medium communicatively coupled to the at least one second processor, the second non-transitory computer readable medium having stored thereon computer software comprising a second set of instructions that, when executed by the at least one second processor, causes the vehicle to:
         receive the one or more command instructions; and
         send instructions to the propulsion system to move the vehicle to particular coordinates in the identified at least one geographic area, based on the received one or more command instructions;
   wherein the first set of instructions, when executed by the at least one first processor, further causes the computing system to:
      establish wireless network communications between the mobile wireless base station of at least one vehicle of the one or more vehicles and the at least one wireless network node of the telecommunications network that is proximate to the at least one geographic area.

20. The system of claim 19, wherein the second set of instructions, when executed by the at least one second processor, further causes the vehicle to:
   relay wireless network communications, via the mobile wireless base station, between the at least one wireless network node of the telecommunications network and one or more user devices located within the identified at least one geographic area.

\* \* \* \* \*